United States Patent
Edwards

(10) Patent No.: US 11,345,586 B2
(45) Date of Patent: May 31, 2022

(54) TAPPING VALVE

(71) Applicant: Ourip Pty Ltd, Glenelg (AU)

(72) Inventor: Simon Edwards, Seaford Rise (AU)

(73) Assignee: Ourip Pty Ltd, Glenelg (AU)

( * ) Notice: Subject to any disclaimer, the term of this patent is extended or adjusted under 35 U.S.C. 154(b) by 0 days.

(21) Appl. No.: 17/604,520

(22) PCT Filed: Apr. 20, 2020

(86) PCT No.: PCT/AU2020/050387
§ 371 (c)(1),
(2) Date: Oct. 18, 2021

(87) PCT Pub. No.: WO2020/210880
PCT Pub. Date: Oct. 22, 2020

(65) Prior Publication Data
US 2022/0089428 A1    Mar. 24, 2022

(30) Foreign Application Priority Data
Apr. 18, 2019 (AU) ................................ 2019901346

(51) Int. Cl.
*B67D 3/04* (2006.01)
*F16K 31/50* (2006.01)
(Continued)

(52) U.S. Cl.
CPC ............. *B67D 3/045* (2013.01); *B67D 3/047* (2013.01); *F16K 3/246* (2013.01); *F16K 27/065* (2013.01); *F16K 31/504* (2013.01)

(58) Field of Classification Search
CPC ......... B67D 3/045; B67D 3/047; F16K 3/246; F16K 27/065; F16K 31/504
(Continued)

(56) References Cited

U.S. PATENT DOCUMENTS 3,308,224 A * 3/1967 Rogor .................. B67D 3/047
264/242
4,619,377 A * 10/1986 Roos ...................... B67B 7/26
222/129

(Continued)

FOREIGN PATENT DOCUMENTS

EP    0272906 A2    6/1988
JP    2008-207867 A    9/2008

OTHER PUBLICATIONS

Mark Armstrong, International Search Report regarding PCT/AU2020/050387, dated Jul. 23, 2020, Australian Patent Office.

*Primary Examiner* — John Bastianelli
(74) *Attorney, Agent, or Firm* — Edwin A. Sisson, Attorney at Law, LLC; Jeffrey J. Banyas

(57) ABSTRACT

A tap assembly for reducing the infiltration of fluid from the exterior of a fluid container to the interior of a fluid container comprising a tap valve, a valve closure, and a hollow tap body. The tap body provides a fluid outlet for allowing the passage of fluid through the tap assembly and a multi-start male thread to slidably move the valve closure from an open position to a closed position. The tap assembly further comprises three concentric securement pieces configured to interface with the fluid container and form a three-point locking mechanism interlocking the three concentric securement pieces.

13 Claims, 10 Drawing Sheets

(51) Int. Cl.
*F16K 3/24* (2006.01)
*F16K 27/06* (2006.01)

(58) Field of Classification Search
USPC .................................. 222/511; 251/296, 265
See application file for complete search history.

(56) References Cited

U.S. PATENT DOCUMENTS

| | | | | |
|---|---|---|---|---|
| 5,111,970 | A | * 5/1992 | Rutter | ..................... B67D 3/047 |
| | | | | 222/105 |
| 6,978,981 | B2 | * 12/2005 | Roos | ....................... B67D 3/045 |
| | | | | 251/265 |
| 2004/0135113 | A1 | 7/2004 | Roos | |
| 2005/0211726 | A1 | 9/2005 | Pritchard | |
| 2011/0011898 | A1 | 1/2011 | Bellmore | |
| 2015/0001261 | A1 | 1/2015 | Johnson | |

* cited by examiner

TAPPING VALVE

PRIORITIES AND CROSS REFERENCES

This Application claims priority from International Application No. PCT/AU2020/050387 filed on 20 Apr. 2020 and Australian Application No. 2019901346 filed on 18 Apr. 2019 the teachings of each of which are incorporated by reference herein in their entirety.

TECHNICAL FIELD

The present invention relates to a tap assembly for reducing the infiltration of fluid from the exterior of a fluid container to the interior of a fluid container. Embodiments generally provide a tap valve further comprising a valve closure in sliding engagement across an interior surface of a hollow tap body, and a series of concentric securement pieces for attaching the tap assembly to a fluid container.

BACKGROUND

Wine is typically distributed and stored in glass bottles and sealed with a cork stopper. Once opened or if improperly stored, cork stoppers can become less effective at sealing the bottle, which allows atmospheric gases to pass through the bottle opening and become absorbed into the wine. Chemical oxidation of wine through prolonged exposure to atmospheric gases causes oxidation of phenolic and polyphenolic compounds that impart flavour and other unique characteristics of wine.

However, the adverse impact of wine oxidation is twofold; not only are desirable flavours and qualities of wine degraded, but undesirable by-products, such as sulphur and sulphur-containing compounds are produced. These compounds are unpalatable and cause defects in wine known as 'wine taint'. It is therefore typically recommended that bottled wine be entirely consumed within three to four days after opening the bottle.

'Bag-in-box' bags present an alternative to bottling and are typically suited to wine that is less likely to improve during storage and is more likely to become consumed in larger quantities over longer periods of time. Wine distributed and consumed from a bag-in-box bag is typically recommended for consumption within eight to twelve months from the bag fill date, and for finishing within a month of initially opening the bag-in-box bag.

According to the Australian Bureau of Statistics, more than half of the wine consumed in Australia is packaged and sold in bag-in-box bags. Bag-in-box wines make up more than half of the wine sales in Sweden and Norway, 20% in the United Kingdom and France, and about 18% in the United States. Due to the globalisation of wine businesses, and an increased popularity of boxed wines, bag-in-box wines are frequently transported from the location of manufacture and bottling to their consumer markets across the world.

Due to the low cost, easy handling, and easy transportation of bag-in-box bags, many other food and beverage products such as water, wine, milk, iced tea, and juices are also being stored and sold in bag-in-box bags. All are prone to eventual deterioration upon exposure to oxygen, which degrades their quality. All food and beverage products contain constituents amenable to degradation via oxidation or spoilage from the absorption of other volatile compounds, in some instances generating by-products of oxidation or other chemical processes that are unpalatable or toxic, and that may alter the physical characteristics of the product. Even in the case of potable water, the absorption of atmospheric Volatile Organic Compounds (VOCs) into the water due to atmospheric penetration into the bag over time is a major concern as these VOCs are potentially toxic and reduce the shelf life of the product.

Commercially available bag-in-box assemblies comprise a bag containing fluid, a tap for dispensing the fluid, and a box for handling and storing the bag. The tap is connected to an opening through the bag and enables a user to dispense the contents from the bag at will. Bag-in-box assemblies can typically be operated with one hand, they allow more fluid to be stored in a smaller volume of space and they are less fragile that bottles. These qualities are not only desirable for storing, distributing, and dispensing wine, but they are also beneficial for storing, distributing, and dispensing other fluids.

Bag-in-box bags are typically provided with a large opening that enables most types of taps to be fitted to the bag and a reasonable rate of flow for the fluids stored within the bag. For oxygen sensitive fluids, such as wine, this opening provides a significant opportunity for oxygen to enter the wine during the filling of the bag and through the somewhat permeable plastic tap fitting. Therefore, the larger the opening the greater the chance for oxygen to in filtrate the tap fitting to penetrate the fluid bag.

A myriad of tap designs of varying construction is available in the marketplace, which aim to contain fluids within their container with little or no leakage. Very few attempt to address the infiltration of gasses into the container through the container opening or through the tap mounted thereon to dispense the container fluid.

Some bag-in-box assemblies comprise reusable taps that are simply pushed and locked into the bag opening. These taps can easily damage the bag or the tap itself due to the force applied to push the tap into the opening to create a seal. Some taps are comprised of a combined piercer and valve, where the piercer is used to simultaneously puncture the bag wall to create a bag opening and attach the valve within the opening. However, the piercer can also puncture the opposite wall of the bag, thereby creating another opening that causes fluid leakage or penetration of atmospheric gases into the bag.

Other bag-in-box assemblies include self-closing taps having an opening valve operable against linearly elastic material. The linearly elastic material maintains tension against the valve such that the tap is in a closed position unless a consumer applies pressure on it to release the valve. However, these taps are typically made from polyethylene; a relatively permeable material which permits the entry of atmospheric gases into the fluid bag.

Some bag-in-box assemblies include taps comprised of many parts including a cap, a body, four to five O-rings, a driving member, and a metal spring. Such assemblies are difficult to assemble causing users to often skip connecting parts considered inconsequential, or loosely connect one or more parts while assembling the tap onto the bag-in-box bag. The loose connections permit the penetration of atmospheric gases, which penetrate through the loose parts into the fluid bag.

Other bag-in-box assemblies include press taps, push button taps, and flex taps, all of which can require users to exert a large amount of pressure against the force exerted by the weight of the fluid contents into the bag to open the tap. These are not only unergonomic or awkward to handle, but many of these taps or the bags they are attached to are easily damaged due to the mechanical stress caused during the transportation of the bag-in-box assemblies. Further, the pressure exerted on the taps due to the weight of the fluid content in the bag can also damage the taps and increase atmospheric gases penetrating into the fluid bag.

Due to the increasing demand of the bag-in-box bags that impart a longer shelf life on wine and other fluids, largely by reducing atmospheric gas penetration into the bag; tap assemblies are required that are easy to assemble, are less prone to damage or mechanical stress, and are designed to reduce the opportunity for atmospheric gases to enter the bag during storage and/or use.

SUMMARY OF INVENTION

In a broad form, embodiments of invention relate to a tap assembly for reducing the infiltration of fluid from the exterior of a fluid container to the interior of a fluid container comprising; a tap valve further comprising a valve closure in sliding engagement across an interior surface of a hollow tap body, the tap body comprising; a first wall having an exterior surface and at least three apertures formed therethrough, the apertures including; an upper aperture providing an opening for slidably receiving at least a portion of the valve closure therein, an intermediate aperture for allowing the passage of fluid therethrough, and a lower aperture providing a fluid outlet, and a multi-start male thread projecting concentrically from the exterior surface of the first wall in proximity to the upper aperture opening and configured to engage with a female thread on the valve closure, the valve closure further comprising; a plugging portion having an external surface configured to slidably fit within the tap body, an at least partially overlapping portion having an internal surface configured to concentrically surround the exterior surface of the first wall and extend at least partially along the length of the tap body, the internal surface of the overlapping portion having the female thread formed concentrically therein and configured to engage with the male thread on the exterior surface of the first wall, wherein the valve closure is configured to slidably move from an open position to a closed position as the male thread passes through the female thread.

In certain embodiments, the intermediate aperture of the first wall extends to a concentric base member, the tap assembly further comprising; three concentric securement pieces having a central opening formed therethrough for allowing the passage of fluid, the three concentric securement pieces including; the concentric base member of the tap body having an outer concentric lip portion and an inner concentric lip portion, an internal piece configured to interface with the fluid container, and having an outer concentric groove portion and an inner concentric groove portion, and an intermediate piece for securing the concentric base member with the internal piece, and having an outer concentric lip portion and an inner concentric groove portion, wherein the concentric lip portions form an interference fit with the concentric groove portions thereby forming a three-point locking mechanism interlocking the three concentric securement pieces.

The multi-start male thread of preferred embodiments comprises two or more substantially uniformly distanced extrusions projecting concentrically from the exterior surface of the first wall at an edge of the first wall defining the upper aperture opening. In certain embodiments the multi-start male thread comprises three substantially uniformly distanced extrusions.

The tap assembly of preferred embodiments comprises three or more sealing portions extending concentrically about the external surface of the plugging portion and the interior surface of the first wall wherein the sealing portions are configured to engage to form a seal therebetween.

The valve closure may comprise a sealing bead configured to be moveable between an open position and closed position for opening and closing the lower aperture of the first wall, a first sealing portion is configured to be moveable between a second sealing portion and a third sealing portion, and the first sealing portion is configured to; form a seal with the second sealing portion when the sealing bead is in the open position, and form a seal with the third sealing portion when the sealing bead is in the closed position.

In certain embodiments, tap assemblies comprise valve closures wherein; the valve closure comprises a plugging means having an actuator in connection with a sealing bead configured to be moveable between an open position and a closed position for opening and closing the lower aperture of the first wall, the plugging portion is configured to be moveable between a raised position and a lowered position, a first sealing portion is configured to be moveable between a second sealing portion and a third sealing portion, and the first sealing portion is configured to; form a seal with the second sealing portion when the plugging portion is in the raised position, and form a seal with the third sealing portion when the plugging portion is in the lowered position.

The valve closure of certain embodiments may be configured to be moveable between a raised position and a lowered position, and the female thread on the valve closure extends concentrically in a single direction about the internal surface of the overlapping portion to move the valve closure between the lowered position to the raised position by rotating the valve closure in a single direction, or the female thread on the valve closure extends concentrically in two opposing directions about the internal surface of the overlapping portion to move the valve closure between the lowered position to the raised position by rotating the valve closure in either direction.

The internal piece of embodiments may comprise a flexible material for affixing at least a portion of the internal piece to the fluid container.

In a preferred form, the tap assembly comprises a first wall wherein; the first wall forms a substantially cylindrical body terminating at an upper circumferential edge and having three rhombus shaped extrusions thereon and projecting outwardly from the external surface of the substantially cylindrical body, whereby a surface is provided by an uppermost face of the rhombus extrusions and the upper edge of the first wall substantially perpendicularly to the external surface, the internal surface of the first wall having a second annular sealing ridge and a third annular sealing ridge extending therefrom, the second annular sealing ridge at the upper circumferential edge of the first wall projecting inwardly substantially perpendicularly from the internal surface, and the third annular sealing ridge above the intermediate aperture projecting inwardly substantially perpendicularly from the internal surface, the substantially cylindrical body terminating at a lower edge in a circumferential tapered wall defining a concentric opening providing the fluid, the first wall having an edge defining the intermediate aperture connected with a substantially cylindrical connecting piece forming a conduit for the passage of fluid therethrough, the connecting piece terminating at an annular edge connected with a substantially circular concentric base member, extending substantially perpendicularly therefrom and having a central opening formed therethrough, the valve closure comprising a hollow plugging portion having a substantially cylindrical exterior surface, the plugging portion configured to substantially fill the space between the exterior surface of the plugging portion and the internal surface of the first wall, the plugging portion extending to lap upon itself providing a substantially cylindrical overlapping portion having a diameter greater than the external surface of the first wall, the exterior surface of the plugging member having a first annular sealing ridge extending therefrom, the first annular sealing ridge projecting outwardly substantially perpendicularly from the exterior surface positioned between the second annular sealing ridge and the third annual sealing ridge, and the plugging portion terminating at a lower edge in a circumferential tapered wall terminating with a central sealing bead.

Further, a preferred tap assembly comprises a concentric base member comprising an inner ring defining the inner concentric lip portion and an outer ring having a larger diameter than the inner ring and defining the outer concentric lip portion, the internal piece comprises a flexible ring providing a surface for affixing the internal piece to the fluid container, and a rigid ring extending substantially perpendicularly therefrom having an inner groove portion and an outer groove portion, and the intermediate piece comprising first support ring and a second support ring, the first support ring having an inner edge defining a smaller bore and the inner concentric lip portion, and the second support ring having an inner edge defining a larger bore and the inner concentric groove portion.

Preferred methods of manufacture of embodiments comprises the steps of; obtaining the fluid container having an opening formed therethrough, positioning the internal piece upon an internal surface of the fluid container to pass a portion of the internal piece through the opening, affixing the internal piece on the internal surface, obtaining the tap body and the valve closure, placing the plugging portion of the valve closure within the tap body, mating the multi-start male thread with the female thread, obtaining the intermediate piece, placing the intermediate piece upon an external surface of the fluid container, fitting the intermediate piece upon the internal piece to form an interference fit between the intermediate piece and the internal piece, placing the concentric base member upon the intermediate piece, fitting the concentric base member upon the intermediate piece to form an interference fit between the concentric base member and the intermediate piece, and an interference fit between the concentric base member and the internal piece.

Preferred methods of use of embodiments comprises the steps of obtaining the tap assembly according to embodiments in a closed position, rotating the valve closure to move the multi-start male thread from a top of the female thread to a bottom of the female thread.

Preferred methods of use of embodiments comprise the steps of; obtaining the tap assembly in a closed position, opening the tap assembly utilising the step of, rotating the valve closure to move the multi-start male thread from a top of the female thread to a bottom of the female thread, or engaging the actuator to move the sealing bead from the closed position to the open position.

The fluid containers may contain fluids that may deteriorate upon exposure to oxygen and degrade the quality of fluid. These may include but are not limited to water, wine, milk, tea, juices without pulp and the like. Thus, embodiments of the invention may be adapted to optimise the storage of items contained therein. Preferred containers are formed from inert, opaque, flexible, food grade materials. Accordingly, preferred tap assemblies may be adapted to be affixed to such materials. The contained fluids may also comprise gases such as argon, nitrogen, or the like. And preferred tap assemblies may be adapted to substantially contain such fluids within the bag.

The fluid bag may alternatively be a barrel, a cask, an alternative bag-in-box container, a bottle, a dispensing container or the like. It may comprise an opening for receiving the flexible ring of an internal piece therein.

The tap assembly may be comprised of a rigid material such as metal, nylon, polypropylene, polyethylene terephthalate or combinations thereof. Preferably, these materials may withstand or provide protection from mechanical stress or damage caused by filling, transportation or the flow of fluid therethrough. They preferably also provide a suitable barrier to the penetration of atmospheric gases through the tap assembly.

The tap valve may comprise a valve closure, a tap body and a substantially cylindrical connecting piece wherein the tap body and the substantially cylindrical connecting piece may be formed integrally. The valve closure may comprise a plugging portion shaped to fit within the tap body. The plugging portion may comprise an external surface formed to fit into the tap body. The internal surface of the plugging portion may be hollow portion, preferably shaped to impart functional characteristics, e.g. a cylindrical shape to provide the greatest mechanical strength to the structure. However, it is also anticipated that aesthetic shapes may also be selected without departing from the intended scope of this feature.

In certain embodiments the overlapping portion may be formed as an actuation sleeve for moving the plugging portion within the tap body. The lower end of the plugging portion may be shaped into a narrow end comprising a stopper for permitting or obstructing the flow of the fluid through the fluid outlet.

The actuation sleeve may be formed as a substantially cylindrical structure surrounding the exterior circumference of the overlapping portion, and preferably the overlapping portion having the actuation sleeve also extends half-way down the length of the plugging portion. It may be adapted with indentations or ridges for operating the tap assembly to provide a substantially secure fitting of the plugging portion in the tap body.

The overlapping portion may comprise an internal surface for engaging with the tap body and an outer surface for providing a secured grip to the user. The inner surface may comprise one or more female threads for engaging with the multi-start male thread. The outer surface of the actuation sleeve may comprise an indented surface for providing a secured grip to the user. The outer surface of the actuation sleeve may be rotated to move between an open or a closed position. The indented surface may be formed into a series of ridges, indentations, or as a tapered surface for providing a rough texture to the outer surface, such that the user may easily grab onto the actuation sleeve. The outer surface of the actuation sleeve may be substituted for a handle, lever, or other actuating mechanism without departing from the intended scope of this feature.

The female thread may extend diagonally from the top to the bottom of the inner surface of the actuation sleeve. They may be shaped as tapered notches, rhombus shaped notches, notches in the form of beads, jaw shaped notches, or the like. The shape of the female thread may correspond to the shape of the multi-start male thread for securely engaging or disengaging the plugging portion of the valve closure with the cylindrical body of the tap body. Preferably, each female thread may be of equal length and may be uniformly spaced with respect to the multi-start male thread.

The stopper may be formed as a sealing bead for sealing the lower apertures in the first wall and obstructing the flow of fluid through the fluid outlet. The sealing bead may be shaped as a ball, diamond, cone or any other shape which may correspond to the shape of the lower aperture in the tap body. In another form, the plugging portion of the valve closure may comprise a flat bottom surface for obstructing the flow of fluid from the lower aperture.

In a further alternate form, the valve closure may comprise an integral push button and shortened plugging portion wherein the sealing bead is attached to the push button by a connecting link and is normally closed to obstruct flow through the fluid outlet. In this form, the valve closure may be rotated to an open position and the push button engaged to raise the sealing bead from obstructing the fluid outlet.

The tap body may be configured as a cylindrical body comprising a hollow portion for receiving the corresponding plugging portion of the valve closure therein. The cylindrical body may further comprise an interior surface having a diameter slightly larger than that of the external surface of the plugging portion of the valve closure. When the plugging portion of the valve closure is engaged with the corresponding cylindrical body of the tap body, the external surface of the plugging portion neatly slides against the interior surface of the cylindrical body.

The valve closure and/or the tap body may further comprise three or more sealing portions or series of threaded portions to improve sealing between the valve closure and the tap body. A first sealing ridge may project about the circumference of the external surface of the plugging portion, and a second and third sealing ridge may project about the circumference of the interior surface of the tap body first wall. The first sealing ridge may be located at a position on the plugging portion between the second and third sealing ridge.

Configured thus, the first sealing ridge moves between the second and third sealing ridge as the plugging portion is raised and lowered so as to create a seal between the first and second sealing ridge when the plugging portion is raised and between the first and third sealing ridge when the plugging portion is lowered. Notably, while no seal is created via these sealing ridges during the movement of the plugging portion between the open and closed positions, a seal is created when the plugging portion is completely raised and placed in an open position and also when it is completely lowered and placed in a closed position, thus creating a further point of exclusion to the infiltration of fluids into the fluid container not only when the tap assembly is closed, but also when it is open and fluid is passing through the fluid outlet.

Preferably, the second sealing ridge protrudes substantially perpendicularly from the internal surface of the first wall about the perimeter of the upper edge of the first wall. Preferably, the third sealing ridge protrudes substantially perpendicularly from the interior surface of the first wall about the circumference of the wall at a location above the intermediate aperture. Preferably, the first sealing ridge protrudes substantially perpendicularly from the external surface of the plugging portion at a location above the intermediate aperture and between the second sealing ridge and the third sealing ridge.

The first wall of the tap body may further define an upper aperture at an upper edge for allowing the plugging portion of the valve closure to be placed within the tap body therethrough. The diameter of the upper aperture may substantially correspond with the diameter of the external surface of the plugging portion such that the plugging portion of the valve closure may easily enter through the upper aperture.

The tap body may further comprise a multi-start male thread that may be shaped for securely engaging with one or more corresponding female threads. The multi-start male thread may be formed around the perimeter of the first aperture. The multi-start male thread may be formed as a protruded surface to securely engage with the female thread protruding substantially perpendicularly from the internal surface of the overlapping portion.

The one or more female threads may allow for approximately 90° of rotation to constitute a complete opening or closing of the tap valve. The female threads may allow this rotation in a single direction for opening or closing or may allow rotation in both directions for opening and closing. The female threads may allow for partial or complete repositioning of the male thread throughout the approximately 90° of female thread.

The multi-start male thread may formed as tapered portions, for example, as rhombus shaped extrusions, extrusions in the form of beads, or jaw shaped extrusions or any other shape. The shape of the multi-start male thread may correspond to the shape of the female thread such that the cylindrical body of the tap body may securely engage or disengage with the plugging portion of the valve closure.

The first wall may further define a lower aperture which may be formed in a lower surface extending from a lower edge in the first wall, whereby the lower aperture is formed for dispensing the fluid therethrough. The first wall may further comprise an intermediate aperture for connecting the tap body to a concentric base member. At one end, the substantially cylindrical connecting piece may be joined to the edge in the first wall defining the intermediate aperture. At the opposing end, the substantially cylindrical connecting piece may be joined about an annular opening formed in the substantially circular concentric base member. The intermediate aperture may be positioned substantially above the lower aperture for permitting the flow of fluid through a conduit formed in the substantially cylindrical connecting piece and in a downward direction.

Preferably, the multi-start male thread may be formed from two or more portions of substantially equivalent distance form one another, such that minimal force need be applied by the user to move the plugging portion between a closed and open position. The minimal applied force may be such that distortions due to interactions between the male and female threads are reduced and limited to the top of the tap body, thus reducing the passage of atmospheric gases through the tap assembly.

The diameter of the intermediate aperture may be larger than that of the lower aperture such that when the valve assembly is in open position, the intermediate aperture provides no resistance to the flow of fluid in the downward direction, thereby allowing the fluid to easily flow through the lower aperture while restricting the flow of atmospheric gases entering the fluid bag.

The diameter of the lower aperture may be formed to receive the sealing bead for obstructing the flow of fluid therethrough. The female thread of the overlapping portion may be engaged with the multi-start male thread such that the plugging portion may slidably fit into the cylindrical body of the tap body. In the open position, the actuation sleeve may be partially rotated to move the stopper substantially below or parallel to the intermediate aperture for permitting the fluid of flow through the lower aperture. In the closed position, the actuation sleeve may be rotated further to slidably engage the female thread with the multi-start male thread such that the stopper may substantially fit within the lower aperture for obstructing the flow of fluid.

The actuation sleeve may be rotated in a reverse direction to reposition the multi-start male thread within the female thread such that the stopper may be raised from its closed position to an open position inline with or above the intermediate aperture for permitting the flow of fluid through the lower aperture.

The valve closure may be formed to obstruct the infiltration of fluid through the substantially cylindrical body at two points, preferably one point may be the lower aperture and the second point may be the intermediate aperture of the tap body.

The conduit may be formed within the substantially cylindrical connecting piece may for channelling the flow of fluid therethrough. The conduit may comprise a first end terminating at the intermediate aperture of the tap body and a second end terminating at the substantially circular concentric base member for connecting the tap valve to the internal piece or the rigid ring.

The concentric base member may comprise one or more annular ridges around its outer surface for providing a substantially snap fitted, or a substantially secured connection with the internal connector. The annular ridge may be formed integrally to the concentric base member. Alternatively, the annular ridge may be formed as a sealing means, for instance, one or more O-rings may be provided around the concentric base member for providing a secured connection with the internal connector.

The conduit may be formed as an integral component of the tap valve and may be formed in any one of a number of shapes or confirmations configured to receive and dispense the contained fluid. In a preferred embodiment, an elbow shaped tap may be formed from a bent tubular body comprising a bent portion and a tubular body wherein the tubular body may be formed to receive the contained fluid and the bent portion may be formed to dispense the contained fluid.

The external surface of the intermediate piece may comprise one or more annular rings brought together to form one or more grooves therebetween and one or more annular lips therebetween. The lip and groove may be provided for engaging or snap fitting onto the inner ring of the base member and the rigid ring of the interior piece. The annular rings may be a first support ring and a second support ring for providing structural support to the tap assembly. The annular rings may be formed from the aforementioned rigid materials for providing structural support to the tap assembly.

The support rings of the intermediate piece may be formed integrally for providing an additional structural support to the valve assembly. The support rings may be affixed to form one or more grooves. The support rings may comprise a support aperture having a greater diameter than that of the connecting end of the substantially cylindrical connecting piece and the inner ring of the base member.

One or more of the support rings may be configured to engage with a device for filling the fluid container with a fluid. Further, one or more of the rigid support rings may be configured to affix to the wall of a box for maintaining a bag of fluid therein.

One or more of the support rings may further comprise a securement seat that may be shaped as a ridge, a flange, an indented surface or a groove for snap fitting the second substantially annular ring of the integral base portion and substantially securing it therein. The securement seat may be formed on either surface of the ring.

Preferably, One or more of the support rings may be positioned between the tap valve and the internal piece for allowing the user to easily assemble and secure the tap valve and the internal piece.

The internal piece may comprise a substantially flexible ring further comprising a substantially flexible portion wherein the flexibility of the substantially flexible portion may be provided for allowing the substantially flexible portion to enter from either the outside or the inside of the opening of the fluid bag. In either form, the substantially flexible portion may be affixed directly to the fluid bag without the need of any adhesive or heat. However, a person skilled in the art may use adhesives or heat, as desired. In certain preferred forms, however, heat may be applied to affix the substantially flexible portion to the fluid bag.

The internal piece may further comprise a neck portion for snap fitting to the connecting end of the substantially cylindrical connecting piece. The snap fitting between the internal piece and the connecting piece may restrict atmospheric gases penetrating into the fluid bag.

The neck portion may comprise an opening formed as a spout aperture for permitting the flow of fluid from the fluid bag to the support aperture of the intermediate piece or any one or more of the aforementioned apertures of the tapping assembly.

The spout aperture may comprise one or more inner ridges formed at the inner surface of the spout aperture. The diameter of the spout aperture may be smaller than that of the connecting piece for enabling the inner ridge of the neck portion to snap fit into the substantially annular ridge of the connecting piece.

The spout neck may further comprise one or more outer ridges formed at the outer surface of the spout aperture for enabling the outer ridge to snap fit into the support aperture of the intermediate piece.

The inner concentric lip portion or the outer concentric lip portion of the internal piece may be formed as a sealing means for snap fitting and substantially securing the tap valve therein. The sealing means may be provided as one or more O-rings which may be affixed or placed around the neck portion to provide a substantially secure snap fitting.

Alternatively, the intermediate piece and the internal piece may be formed integrally to allow the user to easily assemble the valve assembly.

In a preferred form, the intermediate piece is adhered to the exterior of a bag for holding fluids therein. The internal piece may then be readily affixed to the rigid support ring.

Alternatively, the internal piece may comprise a substantially rigid ring for providing structural support between the tapping assembly and the fluid container.

Several embodiments of the invention are described in the following examples. The invention may be embodied in many different forms and should not be construed as limited to the embodiments described herein. These embodiments are provided by way of illustration only such that this disclosure will be thorough, complete and will convey the full scope and breadth of the invention.

DETAILED DESCRIPTION

Figure 1:
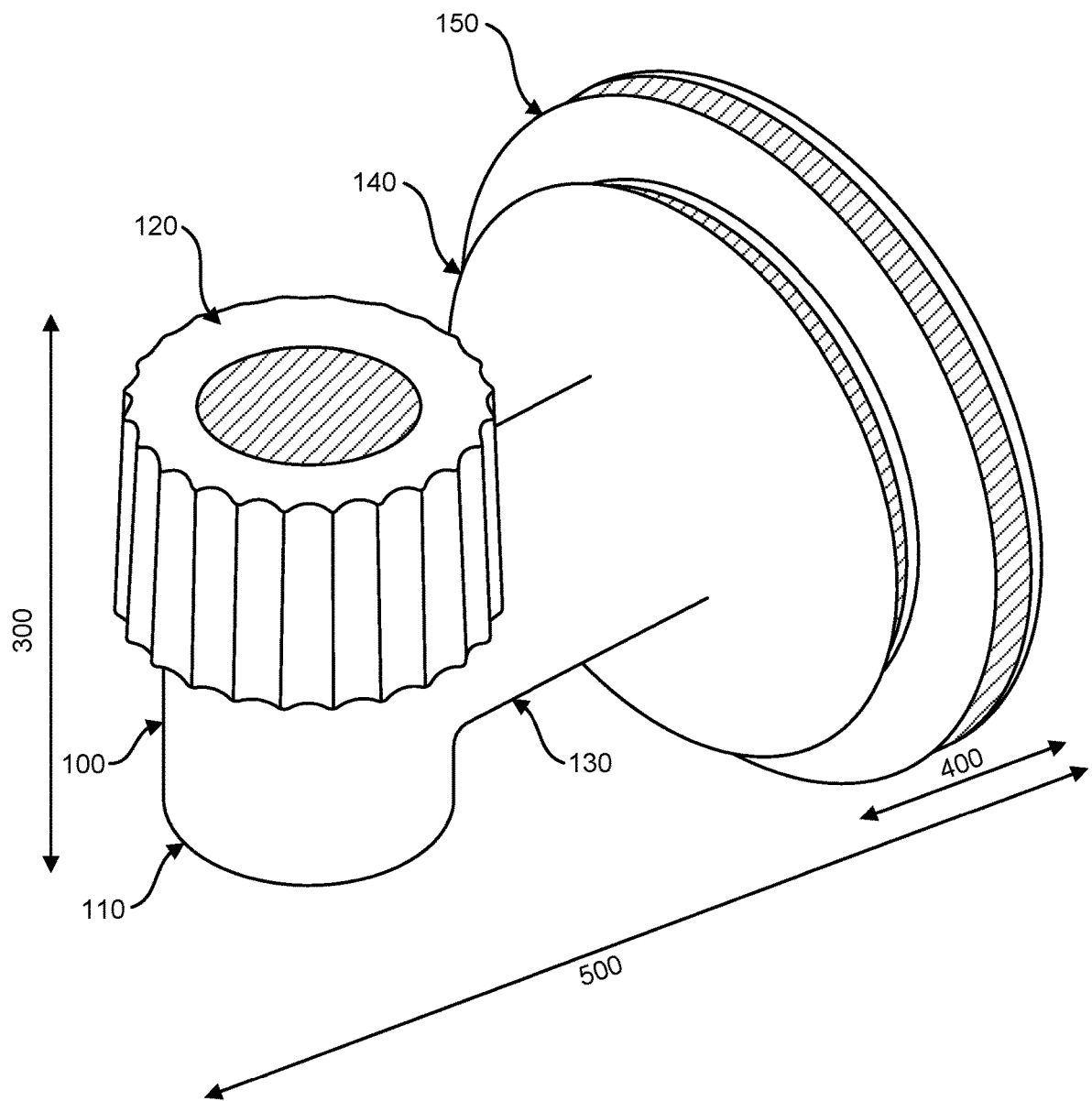
FIG. 1 provides a perspective view of a tap assembly comprising a tap valve and a connector assembly, in accordance with at least one embodiment of the invention.
Figure 3A:
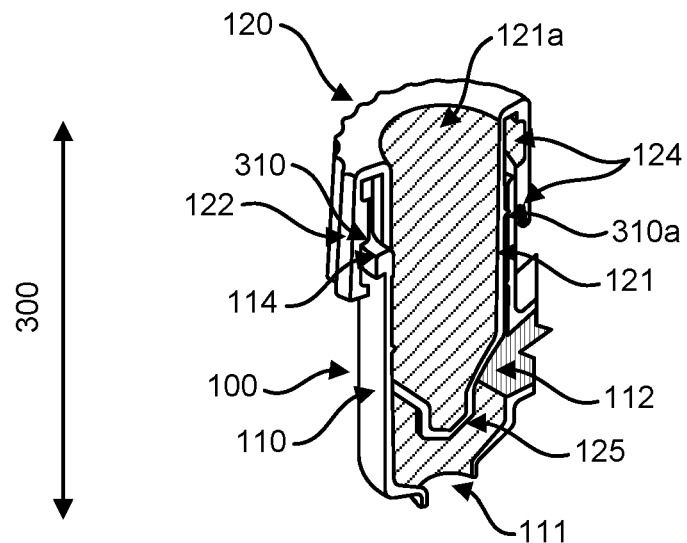
FIG. 3a provides an interior view of the valve closure in an open position, showing a first securement coupling.
Figure 3B:
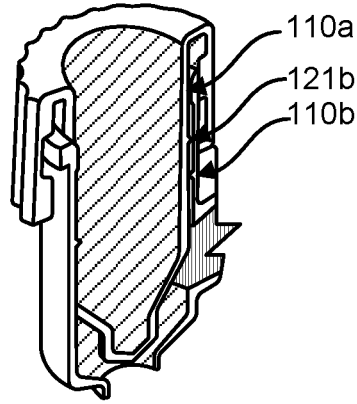
FIG. 3b provides an interior view of the valve closure in an intermediate position.
Figure 3C:
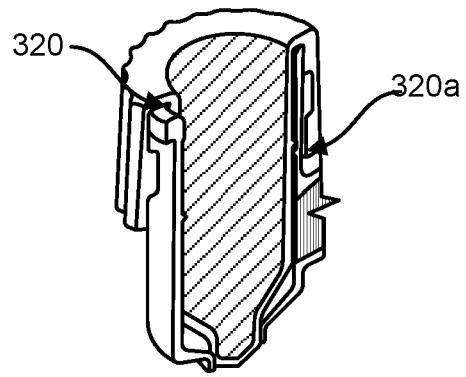
FIG. 3c provides an interior view of the valve closure when in a closed position, showing a second securement coupling.

FIG. 1 provides a perspective view of a tap assembly 500 comprising of a tap valve 300 and a connector assembly 400; the tap valve 300 comprising a tap body 100 and a valve closure 120. The tap body 100 is configured to engage with the valve closure 120, as shown in FIGS. 3a to 3c, such that it can be rotated to move between an open and closed position for permitting or obstructing the fluid flow through the tap body 100. The tap body 100 comprises a tap outlet 110 for receiving and securing the valve closure 120 therein, a connecting stem 130 for allowing the passage of fluid from its one connecting end to the other, and an annular base member 140 for securing the tap body 100 to the connector assembly 400 and maintaining the tap body 100 therein. The tap body 100 is generally configured to allow the fluid to flow in one direction.

Figure 2:
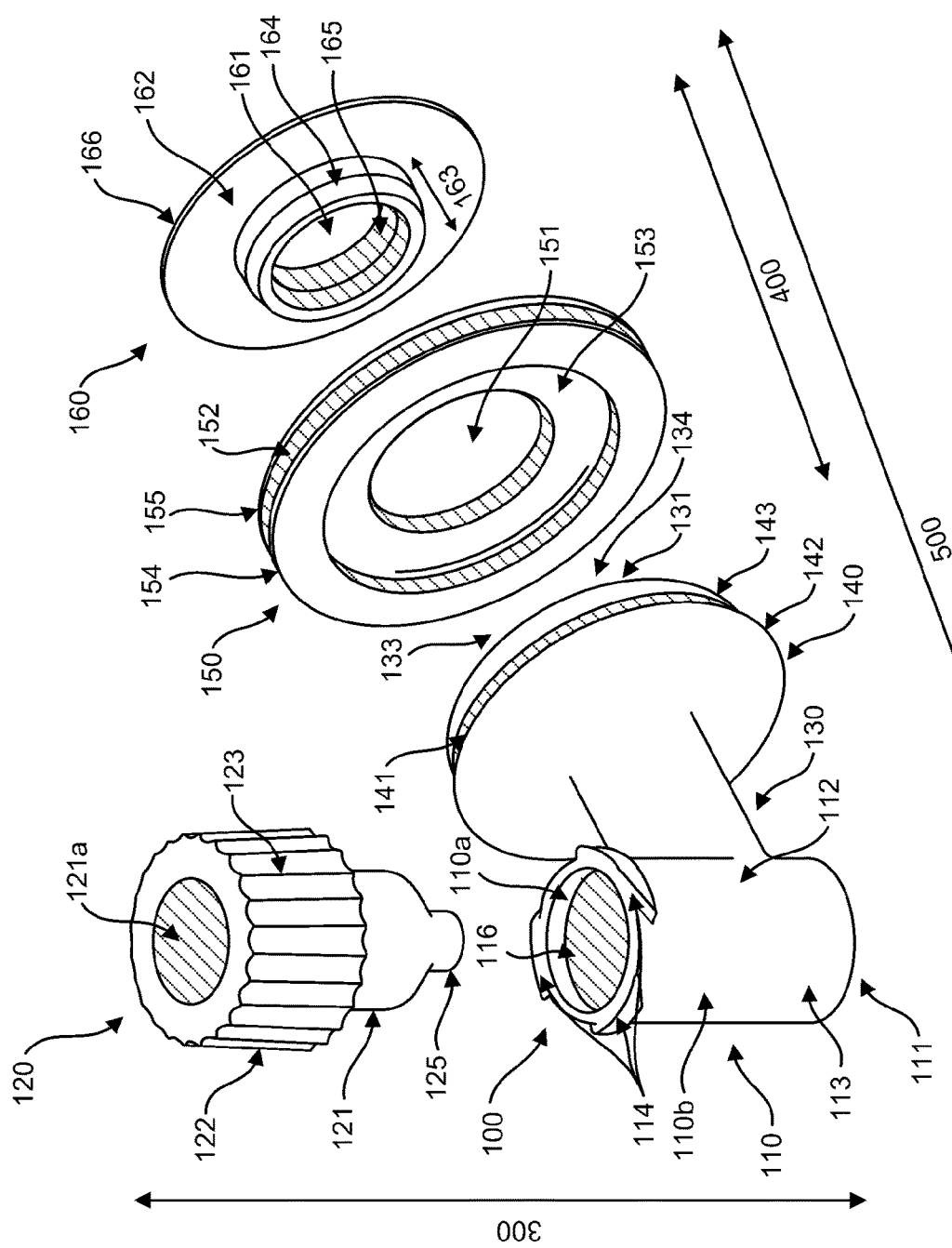
FIG. 2 provides an exploded view of a tap assembly, in accordance with at least one embodiment of the invention, including a tap body, a valve closure, a securement collar and a spout.

FIG. 2 provides an exploded perspective view of the tap assembly 500 illustrating the detailed structures of the tap body 100, the valve closure 120, a securement collar 150 and a spout 160. The tap body is formed as an integral piece comprising the tap outlet 110, the connecting stem 130 and the annular base member 140. The tap outlet 110 is formed as a cylindrical body comprising a hollow cylindrical portion 113, a tap opening 116 configured to receive the valve closure 120, and three small, rhombus shaped extrusions 114 positioned around the perimeter of the tap opening 116.

The shape of the rhombus shaped extrusions 114 forms a tapered edge providing a male multi-start thread for engaging the tap outlet 110 with a corresponding elongated female thread on the valve closure 120 for maintaining the valve closure 120 within the cylindrical portion 113 of the tap outlet 110 and forming the tap valve 300.

The tap outlet 110 further comprises two small apertures wherein a first aperture 111 (not shown) functions as a fluid outlet and a second aperture 112 (not shown) is provided for receiving the fluid from the connecting stem 130 and channelling the fluid to the first aperture 111. The first aperture 111 is provided at the bottom of the tap outlet 110 with a diameter small enough to allow the fluid to easily flow from of the fluid outlet in an open position, while restricting the passage of atmospheric gases through the tap assembly 500 in a closed position. The second aperture 112 provides an interface between the tap outlet 110 and the connecting stem 130 to provide an opening for receiving and transferring the fluid. The diameter of the second aperture 112 is larger than the first aperture 111, and the closure of the valve closure 120 is configured to be made and maintained in the direction of fluid flow. It is configured and positioned such that a downward force is applied on the valve closure 120 when the valve closure 120 is in its closed position, to prevent the flow of fluid through the first aperture 111.

The tap outlet 110 further comprises a guiding surface 110a positioned at the top internal surface of tap opening 116 and a primary seal 110b (not shown) positioned partially down the length of the internal surface of tap outlet 110, both encircling the circumference thereof.

The connecting stem 130 is a hollow, tubular structure defined by the second aperture 112 and a third aperture 131 (not shown) at a securement end. The connecting stem 130 further comprises a tap neck 133 (not shown) formed around the third aperture 131 which is configured to fit into an opening within securement collar 150 and the spout 160, and engage with the spout 160 at a neck ridge 134.

Annular base member 140 is formed integrally with the connecting stem 130 and is positioned around the body of the connecting stem 130, adjacent to the tap neck 133. The annular base member 140 is comprised of two annular flanges wherein the first flange forms an outer ring 142 having a large diameter and the second flange which forms an inner ring 143 having a smaller diameter than the first. The two rings are integrally connected to form a groove 141 therebetween. The groove 141 is configured to engage with the securement collar 150 and secure the tap body 100 therein.

The valve closure 120 comprises a cylindrical body 121 and a grip 122. The cylindrical body 121 is formed as a hollow, cylindrical structure shaped to firmly fit within the hollow, cylindrical portion of the tap outlet 110. They are both shaped to form a tight fit that leaves no gaps for the penetration of atmospheric gases through the tap assembly 500.

The top surface of the cylindrical body 121 comprises a non-functional opening 121a. The rim of the opening 121a is formed integrally with a grip 122. The grip 122 is configured concentrically surrounding the cylindrical body 121 and extending partially down the length thereof. The grip 122 may be provided with a plurality of ridges 123 (or other forms) that enable a user to rotate the valve closure 120 to move between an open and closed position. The bottom surface of the cylindrical body 121 is shaped to form a narrow plugging end defining a sealing bead 125. The sealing bead 125 is shaped such that it fits within the first aperture 111 of the tap outlet 110.

Cylindrical body 121 further comprises a stop bead 121b (not shown) positioned partially down the length of the external surface and encircling the circumference thereof.

When the valve closure 120 is inserted into the hollow cylindrical portion 113 of the tap outlet 110, it can either be rotated completely to its closed position or rotated to its open position. In either position, the extrusions 114 around the tap opening 116 of the tap outlet 110 allow the valve closure 120 to securely lock into the hollow cylindrical portion 113 of the tap outlet 110.

When the user rotates the valve closure 120 to its closed position, the cylindrical body 121 completely fits into the hollow cylindrical portion 113 of the tap outlet 110 and the sealing bead 125 sits within the first aperture 111 to restrict the flow of fluid through the first aperture 111. When the user rotates the valve closure 120 to its open position, the cylindrical body 121 partially fits into the hollow cylindrical portion 113 of the tap outlet 110 such that the sealing bead 125 is raised at least partially above the second aperture 112 and is disengaged from the first aperture 111 to enable the flow of fluid through the connecting stem 130 and subsequently the first aperture 111.

The connector assembly 400 comprises the securement collar 150 and the spout 160. The securement collar 150 comprises a first support ring 154 and a second support ring 155 having a similar outer diameter. The securement collar 150 is substantially circular and of sufficient diameter to provide structural support to the tap body 100 and the spout 160 when secured to the tap body 100 and spout 160. The first support ring 154 and second support ring 155 are affixed together to form a support ring space 152 around their outer edge and a fourth aperture 151 in the centre of the securement collar 150. The fourth aperture 151 is shaped to form an annular ridge providing a snap fitting connection around the tap neck 133 to secure the tap body 100 therein. The fourth aperture 151 has a larger diameter than the third aperture 131 of the connecting stem 130. It is shaped to receive the tap neck 133 of the connecting stem 130 therethrough and interface with the spout 160.

The first support ring 154 that faces the annular base member 140 comprises a larger inner diameter compared to the second support ring 155 that faces the spout 160, providing a securement seat 153. The first support ring 154 has an inner diameter and shape configured to receive the inner ring 143 of the annular base member 140 and maintain it therein The spout 160 comprises a flexible ring 166 having a flexible ring surface 162 around its edge with a spout neck 163 comprising a fifth aperture 161 at its centre. The outside diameter of the spout neck 163 is sized to allow the spout 160 to securely fit into the fourth aperture 151 of the securement collar 150. The spout neck 163 comprises an outer ridge 164 on its outer surface and an inner ridge 165 on its inner surface. The outer ridge 164 and the inner ridge 165 are configured to engage the securement collar 150 and the tap valve 100, respectively.

FIGS. 3a to 3c provide interior views of the tap valve 300 in open 3a, intermediate 3b, and closed 3c states, highlighting the tap outlet 110 of tap body 100 and the hollow structure of valve closure 120 terminating with non-functional opening 121a. The interior surface of the grip 122 is configured to form three threaded portions 124. The threaded portions 124 are substantially tapered and configured such that each threaded portion, like each extrusion 114, is equally disposed around the perimeter of the cylindrical body to equally distribute the forces acting thereon. Each threaded portion 124 runs diagonally from the top to the bottom of the interior surface of the grip 122, to form the female portion of a helical thread. The threaded portions 124 are configured to position, hold and secure the corresponding extrusions 114 of the tap outlet 110 in either an open or a closed position.

To connect the valve closure 120 to the tap outlet 110, the cylindrical body 121 of the valve closure 120 is positioned inside the tap outlet 110. The valve closure 120 is then rotated such that the extrusions 114 of the tap outlet 110 fits within the corresponding threaded portions 124 forming a first securement coupling 310 at the bottom of the grip 122 thereby, maintaining the valve closure 120 in the open position. In this position, the valve closure 120 sits firmly within the tap outlet 110, preventing accidental or unintentional dislodgement due to the pulling or unscrewing of the valve closure 120. When the valve closure 120 is in an open position, it allows the flow of fluid from the second aperture 112 through the tap outlet 110 and through the first aperture 111. The stop bead 121b on the external surface of cylindrical body 121 engages with the guiding surface 110a to create a first sealing coupling 310a to impede further unscrewing of valve closure 120.

The valve closure 120 can be rotated further through intermediate positions as shown in FIG. 3b, to place it in a closed position as shown in FIG. 3c, such that the extrusions 114 of the tap outlet 110 engage with the corresponding threaded portions 124 to form a second securement coupling 320 at the top of the grip 122. Stop bead 121b on the external surface of cylindrical body 121 engages with the primary seal 110b to create a second sealing coupling 320a to further impede air penetration therebetween. Once the valve closure 120 is in a closed position, the sealing bead 125 of the valve closure 120 fits within the first aperture 111 to prevent the flow of fluid from the first aperture 111.

Figure 4A:
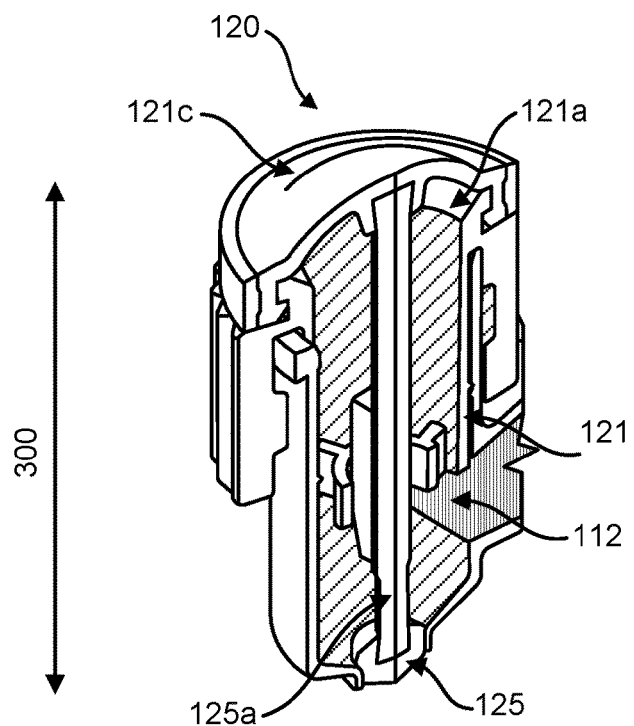
FIGS. 4a, 4b and 4c provide an alternative tap outlet and valve closure comprising a push button mechanism.
Figure 4B:
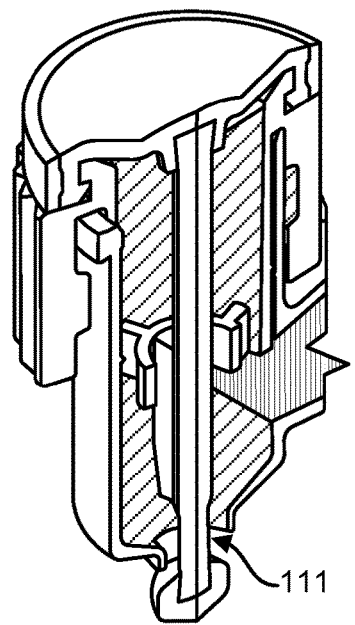
Figure 4C:
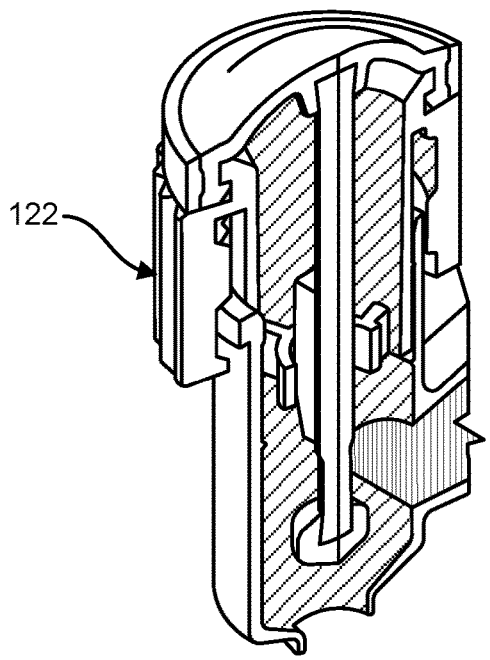

FIGS. 4a to 4c provide an alternative embodiment of the tap valve 300 wherein the valve closure 120 includes a push button plunger mechanism. In this embodiment, the non-functional opening 121a is covered with a push button 121c, cylindrical body 121 is shortened to remove the impedance of flow through second aperture 112, and sealing bead 125 is separated from cylindrical body 121 to thereby be attached to push button 121c by a connecting link 125a.

FIG. 4a provides an internal view of the push button plunger mechanism in an unactuated position. In this position sealing bead 125 engages the first aperture 111 to prevent the flow of fluid therethrough, while FIG. 4b provides an internal view of the push button plunger mechanism in an actuated position. In this position sealing bead 125 is lowered through the first aperture 111 to allow fluid flow therethrough.

FIG. 4c provides an internal view of the push button plunger mechanism in which the cylindrical body 121 is raised by turning the grip portion 122, disengaging sealing bead 125 from the first aperture 111 to allow fluid flow therethrough.

Figure 5A:
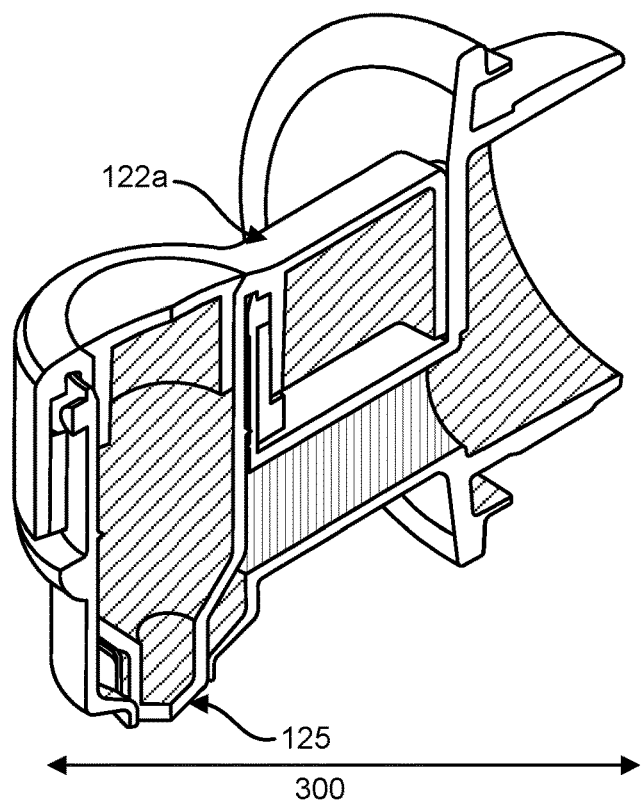
FIGS. 5a and 5b provide an alternative tap outlet and valve closure embodiment comprising a lever mechanism and semi-helical cam surface.
Figure 5B:
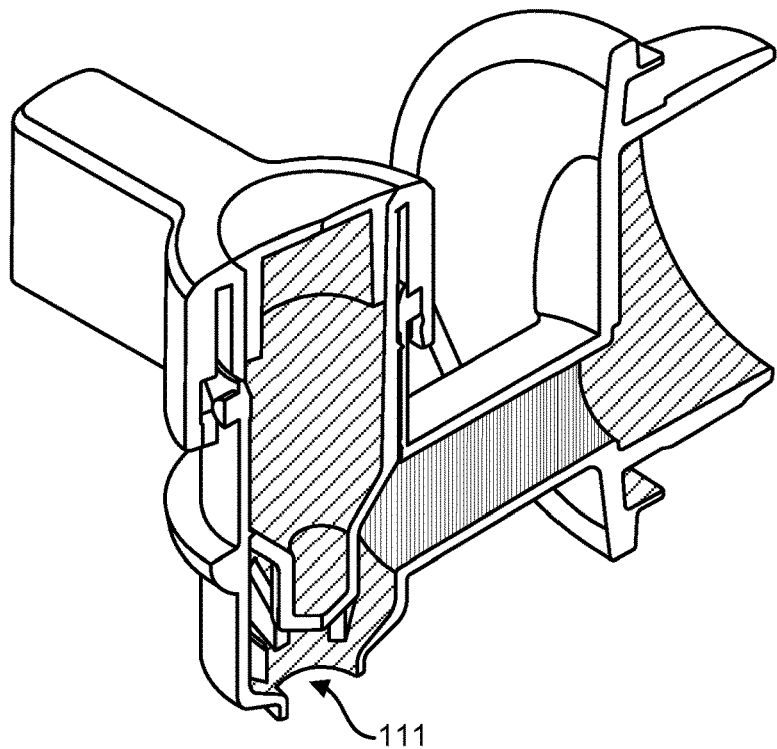

FIGS. 5a and 5b provide an alternative embodiment of the tap valve 300 wherein the grip portion 122 is replaced with a lever 122a which similarly allows the engagement and disengagement of sealing bead 125 with the first aperture 111 to control fluid flow therethrough.

FIG. 5a provides an internal view of the alternative lever-controlled embodiment in a closed position, while FIG. 5b provides an internal view in an open position. The threaded portion is provided in two opposing diagonal directions (not shown) so as to allow for the omnidirectional opening of the tap valve whereby the male thread is actuated via a cam surface within the lever 122a.

Figure 6:
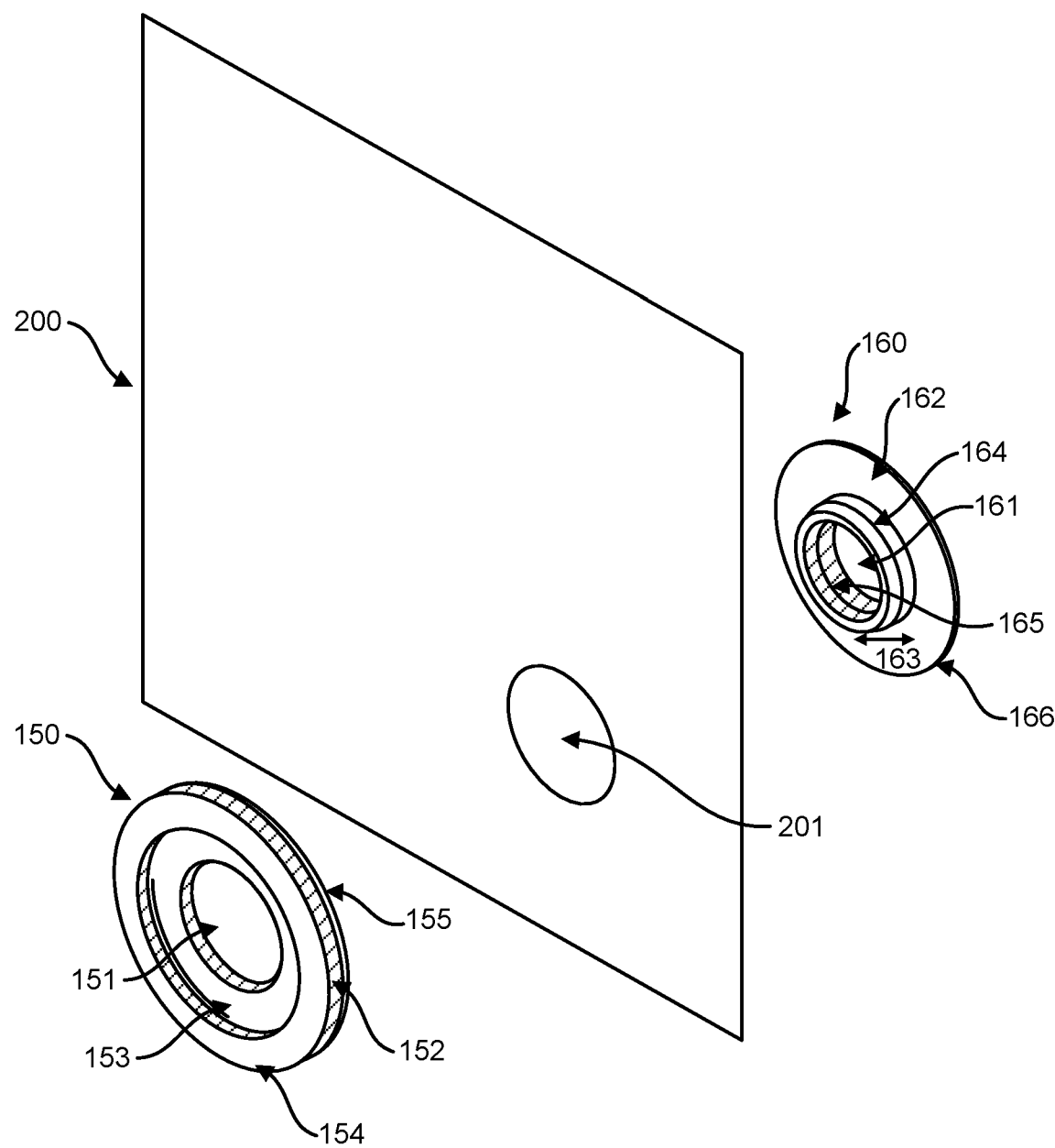
FIG. 6 provides a perspective view illustrating engagement of the securement collar and the spout with the fluid bag, in accordance with at least one embodiment of the invention; the fluid bag having a bag opening for connecting the securement collar and the spout therethrough.

FIG. 6 provides an exploded view of the connector assembly interface with a fluid bag 200 having a bag opening 201 for connecting the spout 160 via the securement collar 150. The flexibility of the flexible ring surface 162 enables the fluid bag 200 to be filled or to discharge the fluid from within the fluid bag without distorting the shape of the spout 160. It also enables the attachment of the spout neck to the bag. The spout neck 163 of the spout is rigid enough to withstand normal use including filling, fitting, handling, transport and use.

Figure 10:
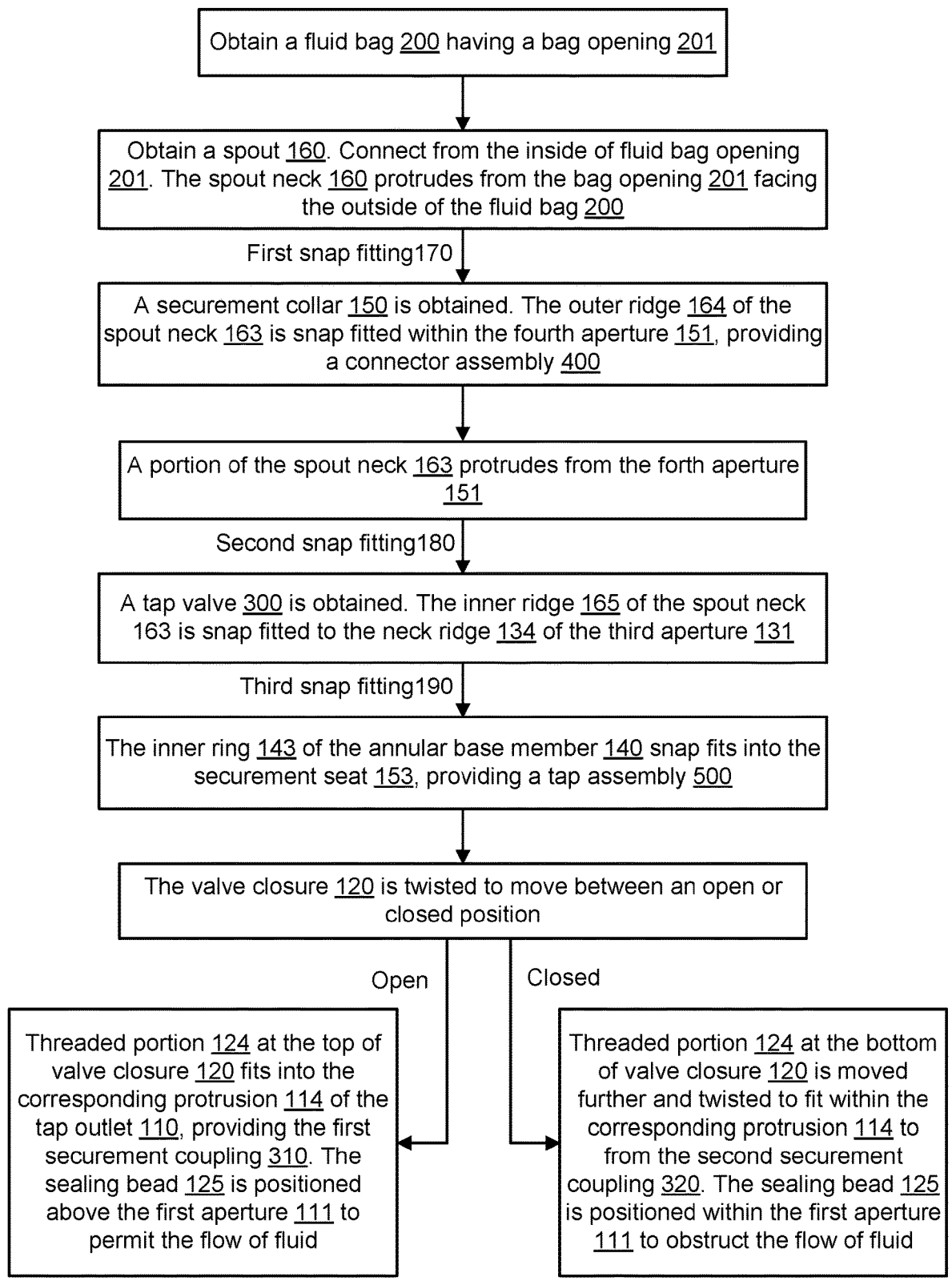
FIG. 10 provides a flow chart illustrating the assembly of a tap onto a fluid bag, in accordance with at least one embodiment of the invention.

As shown in FIG. 6 and described in FIG. 10, the spout 160 is placed through the bag opening 201 of the fluid bag 200, from the inside of the bag. The spout 160 is attached to the fluid bag 200 such that the spout neck 163 sits within the opening 201 and the flexible ring surface 162 sits around the opening 201 for securing the spout 160 therein.

Figure 7:
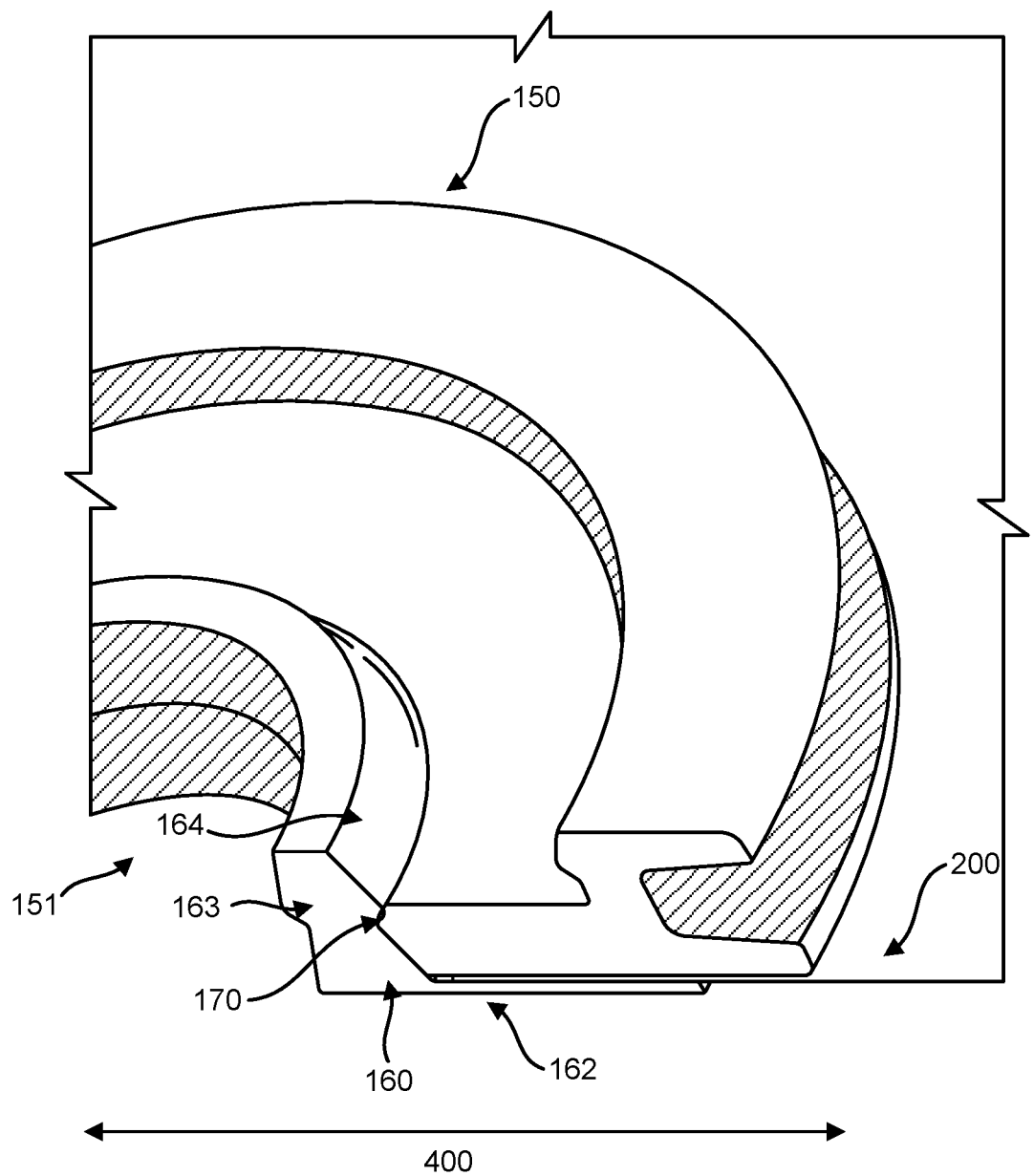
FIG. 7 provides a cross sectional view of a first snap fitting between the securement collar and the spout of the connector assembly, in accordance with at least one embodiment of the invention.

FIG. 7 is a cross sectional perspective view of the interface between the fluid bag 200, the securement collar 150, and the spout 160. The securement collar 150 is obtained and positioned around the spout neck 163 from the exterior of the fluid bag 200. The fourth aperture 151 is sized to allow the securement collar 150 to snap fit with the spout neck 163 via the outer ridge 164. This is referred to as a first snap fitting 170. The first snap fitting 170 between the securement collar 150 and the spout neck 163 provides a coupled connector assembly 400.

The rigidity of the securement collar 150 and the spout neck 163 allows a firm snap fitting therebetween, enabling the assembly to withstand torsion from the rotating action of the valve closure 120, and to support the filling of the fluid bag.

Figure 8:
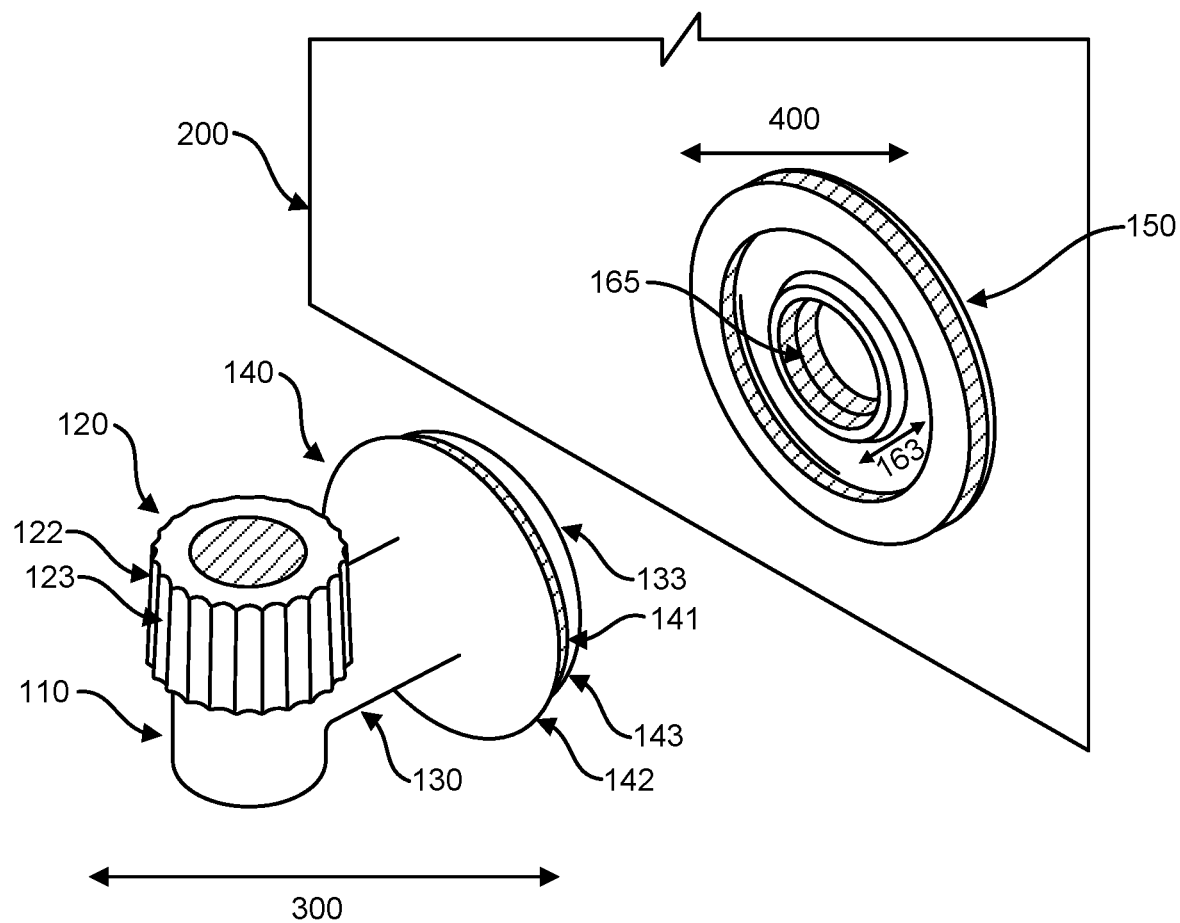
FIG. 8 provides a perspective view showing the second and third snap fittings between a tap valve and a connector assembly, in accordance with at least one embodiment of the invention.

FIG. 8 is a perspective view of the tap valve 300 and connector assembly 400. Once the tap valve 300 is assembled, and the connector assembly is assembled and engaged with bag 200, the tap valve 300 and connector assembly 400 are able to engage to secure the tap valve 300 and connector assembly 400 together.

Figure 9:
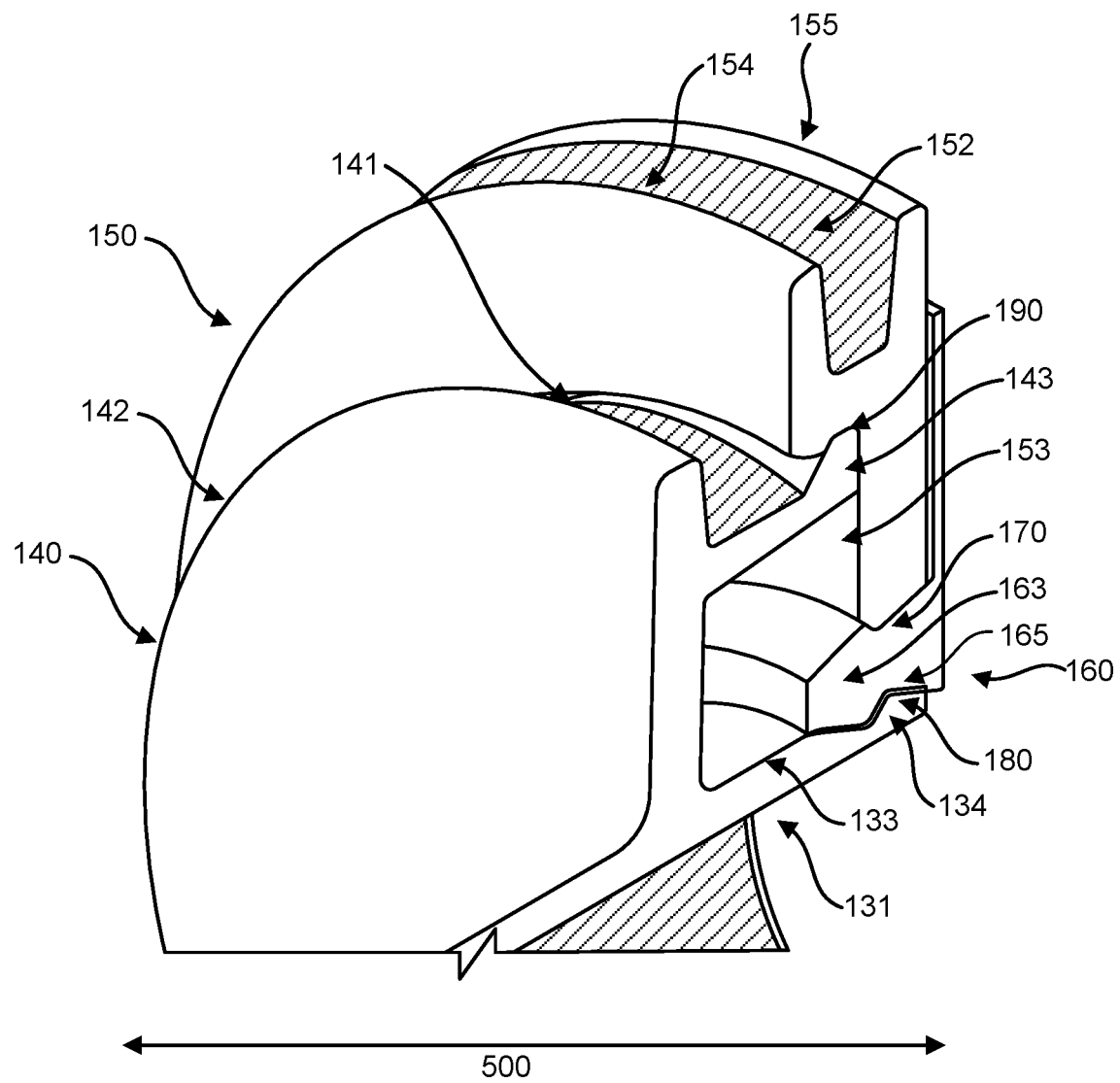
FIG. 9 provides a middle cross-sectional view showing a second and a third snap fitting between the tap valve and the connector assembly, in accordance with at least one embodiment of the invention.

FIG. 9 is a cross sectional perspective view of the interface which forms the assembled tap assembly 500. Once secured, the spout neck 163 of the spout 160 protrudes past securement collar 150. The protruded portion of the spout neck 163 further provides a second snap fitting 180 formed between the tap neck 133 and the spout neck 163, for securing the annular base member 140 therein.

FIGS. 8 and 9 illustrate the first snap fitting 170, second snap fitting 180, and a third snap fitting 190 between the tap valve 300 and the connector assembly 400, providing a tap assembly 500. As shown in FIGS. 8 and 9, the spout neck 163 protrudes from the securement collar 150. As described in FIG. 2, the connecting stem 130 comprises a tap neck 133. The diameter of the tap neck 133 is smaller than the spout neck 163 which allows the tap neck 133 to engage an inner ridge 165 of the spout neck 163 therein. Further, the outer edge of the tap neck 133 comprises a neck ridge 134. Once the tap neck 133 is placed within the fifth aperture 161, the inner ridge 165 of the spout 160 snap fits with the neck ridge 134 of the connecting stem 130, thereby providing the second snap fitting 180 between the annular base member 140 and the spout 160.

As the tap neck 133 and the spout neck 163 are snap fitted together, the inner ring 143 of the annular base member 140 is firmly positioned into the securement seat 153 of the securement collar 150, securing the annular base member 140 therein. Once positioned, the securement seat 153 snap fits around the groove 141 of the annular base member 140, referred as the third snap fitting 190 between the tap valve 300 and the connector assembly 400.

Once the tap valve 300 and the connector assembly 400 are snap fitted together, via the second 180 and the third snap fittings 190, a tap assembly 500 is formed.

The first 170, second 180 and third 190 snap fittings enables the tap valve 100 to secure to the fluid bag 200 and become affixed thereon via a three-point snap fitting of three parts. The three-point snap fitting arrangement is provided to prevent infiltration or exfiltration through any one of the individual snap fitting connections 170, 180, or 190.

Once the tap valve 300 is connected to the fluid bag 200, according to FIGS. 6 to 9, valve closure 120 can rotate opened to allow fluid to flow from the fifth aperture 161 of the spout 160. The fluid is then allowed to pass through the third aperture 131 of the connecting stem 130. Once the fluid reaches the third aperture 131, it passes through the connecting stem 130 and exits through the second aperture 112 to reach the first aperture 111.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It is appreciated the specific connection or attachment mechanisms or methodologies used to connect two particular components of the tap assembly, as described herein, may be utilised to connect other components of the tap assembly, as may be desired.

The various components described herein may be made from any of a variety of materials including, for example, plastic, plastic resin such as polyethylene, polypropylene, nylon, composite material, or rubber, for example, or any other material as may be desired. For example, the tap assembly of this disclosure may be produced from a plastic resin, such as polyethylene, and by injection molding. However, it is appreciated that safe material consideration should be considered in the case that the assembly of this disclosure is to be used with a consumable. The apparatus of the disclosure, as described herein, is used in the context of a bag or alternative container that contains a liquid. However, the apparatus of the disclosure may be used in conjunction with other substances, such as vapor, for example.

A variety of production techniques may be used to make the apparatuses and components described herein. For example, suitable injection molding and other molding techniques and other manufacturing techniques might be utilised. Also, the various components of the apparatuses may be integrally formed, as may be desired, in particular when using molding construction techniques. Also, the various components of the apparatuses may be formed in pieces and connected together in some manner, such as with suitable adhesive or welding.

Fastener, coupling or sealing arrangements, such as those needed to connect the spout to a supporting bag, used in the invention might include welding, compression fit, D-zip, tape and/or adhesive. Suitable faster arrangements acceptable for the intended use (for example to comply with regulations such as food standards or that are fit for the intended purpose) will be well known to persons skilled in the art. Thus, such persons may select between alternative fastener arrangements, as required.

It will be understood that the terms 'fastener' or 'fastening', 'coupling' or 'sealing' when used alone or together with other terms such as 'means' or others, may be used interchangeably where interpretation of the term would be deemed by persons skilled in the art to be functionally interchangeable with another. Further, the use of one of the aforementioned terms does not preclude an interpretation when another term is included.

The various apparatuses and components of the apparatuses, as described herein, may be provided in various sizes and/or dimensions, as desired. Suitable sizes and/or dimensions will vary depending on the specifications of connecting components or the field of use, which may be selected by persons skilled in the art.

It will be appreciated that features, elements and/or characteristics described with respect to one embodiment of the disclosure may be used with other embodiments of the invention, as desired.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on", "extended to" or "within" another element or layer, the element or layer can be directly on, extended to or within another element or layer or intervening elements or layers. In contrast, when an element is referred to as being "directly on", "directly extended to" or "directly within" another element or layer, there are no intervening elements or layers present.

It will be understood that when an element or layer is referred to as being "on", "extended to" or "within" another element or layer, the element or layer can be partially on, extended to or within another element or layer. In contrast, when an element is referred to as being "entirely on", "entirely extended to" or "entirely within" another element or layer, there are no intervening elements or layers present.

As used herein, the term "and/or" includes any and all combinations of one or more of the associated listed items.

It will be understood that, although the terms first, second, third, etcetera, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the description are described herein with reference to diagrams and/or cross-section illustrations, for example, that are schematic illustrations of preferred embodiments (and intermediate structures) of the description. As such, variations from the shapes of the illustrations as a result, for example, of manufacturing techniques and/or tolerances, are to be expected. Thus, embodiments of the description should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this description belongs. It will be further understood that terms, such as those defined in commonly used dictionaries, should be interpreted as having a meaning that is consistent with their meaning in the context of the relevant art and will not be interpreted in an idealised or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the description. The appearances of such phrases in various places in the specification are not necessarily all referring to the same embodiment. Further, when a particular feature, structure, or characteristic is described in connection with any embodiment, it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

While the invention has been described above in terms of specific embodiments, it is to be understood that the invention is not limited to these disclosed embodiments. Upon reading the teachings of this disclosure many modifications and other embodiments of the invention will come to the mind of those skilled in the art to which this invention pertains, and which are intended to be and are covered by both this disclosure and the appended claims.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

It is indeed intended that the scope of the invention should be determined by proper interpretation and construction of the appended claims and their legal equivalents, as understood by those skilled in the art relying upon the disclosure in this specification and the attached drawings.

The invention claimed is:

1. A tap assembly for reducing the infiltration of fluid from the exterior of a fluid container to the interior of a fluid container comprising;

a tap valve further comprising a valve closure in sliding engagement across an interior surface of a hollow tap body, the tap body comprising;
  a first wall having an exterior surface and at least three apertures formed therethrough, the apertures including;
    an upper aperture providing an opening for slidably receiving at least a portion of the valve closure therein,
    an intermediate aperture extending to a concentric base member for allowing the passage of fluid therethrough, and a lower aperture providing a fluid outlet, and
  a multi-start male thread projecting concentrically from the exterior surface of the first wall in proximity to the upper aperture opening and configured to engage with a female thread on the valve closure,
the valve closure further comprising;
  a plugging portion having an external surface configured to slidably fit within the tap body,
  an at least partially overlapping portion having an internal surface configured to concentrically surround the exterior surface of the first wall and extend at least partially along the length of the tap body, the internal surface of the overlapping portion having the female thread formed concentrically therein and configured to engage with the male thread on the exterior surface of the first wall,
the tap assembly further comprising;
  three concentric securement pieces having a central opening formed therethrough for allowing the passage of fluid, the three concentric securement pieces including;
    the concentric base member of the tap body having an outer concentric lip portion and an inner concentric lip portion,
    an internal piece configured to interface with the fluid container, and having an outer concentric groove portion and an inner concentric groove portion, and
    an intermediate piece for securing the concentric base member with the internal piece, and having an outer concentric lip portion and an inner concentric groove portion,
wherein the valve closure is configured to slidably move from an open position to a closed position as the male thread passes through the female thread and the concentric lip portions form an interference fit with the concentric groove portions thereby forming a three-point locking mechanism interlocking the three concentric securement pieces.

2. The tap assembly according to claim 1 wherein the multi-start male thread comprises two or more substantially uniformly distanced extrusions projecting concentrically from the exterior surface of the first wall at an edge of the first wall defining the upper aperture opening.

3. The tap assembly according to claim 2 wherein the multi-start male thread comprises three substantially uniformly distanced extrusions.

4. The tap assembly according to claim 1 comprising three or more sealing portions extending concentrically about the external surface of the plugging portion and the interior surface of the first wall wherein the sealing portions are configured to engage to form a seal therebetween.

5. The tap assembly according to claim 4 wherein;
  the valve closure comprises a sealing bead configured to be moveable between an open position and closed position for opening and closing the lower aperture of the first wall,
  a first sealing portion is configured to be moveable between a second sealing portion and a third sealing portion, and
  the first sealing portion is configured to;
    form a seal with the second sealing portion when the sealing bead is in the open position, and
    form a seal with the third sealing portion when the sealing bead is in the closed position.

6. The tap assembly according to claim 4 wherein;
  the valve closure comprises a plugging means having an actuator in connection with a sealing bead configured to be moveable between an open position and a closed position for opening and closing the lower aperture of the first wall,
  the plugging portion is configured to be moveable between a raised position and a lowered position,
  a first sealing portion is configured to be moveable between a second sealing portion and a third sealing portion, and
  the first sealing portion is configured to;
    form a seal with the second sealing portion when the plugging portion is in the raised position, and
    form a seal with the third sealing portion when the plugging portion is in the lowered position.

7. The tap assembly according to claim 1 wherein the valve closure is configured to be moveable between a raised position and a lowered position, and
  the female thread on the valve closure extends concentrically in a single direction about the internal surface of the overlapping portion to move the valve closure between the lowered position to the raised position by rotating the valve closure in a single direction, or
  the female thread on the valve closure extends concentrically in two opposing directions about the internal surface of the overlapping portion to move the valve closure between the lowered position to the raised position by rotating the valve closure in either direction.

8. The tap assembly according to claim 1 wherein the internal piece comprises a flexible material for affixing at least a portion of the internal piece to the fluid container.

9. The tap assembly according to claim 1 wherein;
  the first wall forms a substantially cylindrical body terminating at an upper circumferential edge and having three rhombus shaped extrusions thereon and projecting outwardly from the external surface of the substantially cylindrical body, whereby a surface is provided by an uppermost face of the rhombus extrusions and the upper edge of the first wall substantially perpendicularly to the external surface,
  the internal surface of the first wall having a second annular sealing ridge and a third annular sealing ridge extending therefrom, the second annular sealing ridge at the upper circumferential edge of the first wall projecting inwardly substantially perpendicularly from the internal surface, and the third annular sealing ridge above the intermediate aperture projecting inwardly substantially perpendicularly from the internal surface,
  the substantially cylindrical body terminating at a lower edge in a circumferential tapered wall defining a concentric opening providing the fluid, the first wall having an edge defining the intermediate aperture connected with a substantially cylindrical connecting piece forming a conduit for the passage of fluid therethrough, the connecting piece terminating at an annular edge connected with a substantially circular concentric base member, extending substantially perpendicularly therefrom and having a central opening formed therethrough, the valve closure comprising a hollow plugging portion having a substantially cylindrical exterior surface, the plugging portion configured to substantially fill the space between the exterior surface of the plugging portion and the internal surface of the first wall, the plugging portion extending to lap upon itself providing a substantially cylindrical overlapping portion having a diameter greater than the external surface of the first wall, the exterior surface of the plugging member having a first annular sealing ridge extending therefrom, the first annular sealing ridge projecting outwardly substantially perpendicularly from the exterior surface positioned between the second annular sealing ridge and the third annual sealing ridge, and the plugging portion terminating at a lower edge in a circumferential tapered wall terminating with a central sealing bead.

10. The tap assembly according to claim 1 wherein;

the concentric base member comprising an inner ring defining the inner concentric lip portion and an outer ring having a larger diameter than the inner ring and defining the outer concentric lip portion, the internal piece comprises a flexible ring providing a surface for affixing the internal piece to the fluid container, and a rigid ring extending substantially perpendicularly therefrom having an inner groove portion and an outer groove portion, and the intermediate piece comprising first support ring and a second support ring, the first support ring having an inner edge defining a smaller bore and the inner concentric lip portion, and the second support ring having an inner edge defining a larger bore and the inner concentric groove portion.

11. A method of manufacture of a tap assembly according to claim 1 comprising the steps of;

obtaining the fluid container having an opening formed therethrough, positioning the internal piece upon an internal surface of the fluid container to pass a portion of the internal piece through the opening, affixing the internal piece on the internal surface, obtaining the tap body and the valve closure, placing the plugging portion of the valve closure within the tap body, mating the multi-start male thread with the female thread, obtaining the intermediate piece, placing the intermediate piece upon an external surface of the fluid container, fitting the intermediate piece upon the internal piece to form an interference fit between the intermediate piece and the internal piece, placing the concentric base member upon the intermediate piece, fitting the concentric base member upon the intermediate piece to form an interference fit between the concentric base member and the intermediate piece, and an interference fit between the concentric base member and the internal piece.

12. A method of use of a tap assembly according to claim 1 comprising the steps of;

obtaining the tap assembly in a closed position, rotating the valve closure to move the multi-start male thread from a top of the female thread to a bottom of the female thread.

13. A method of use of a tap assembly according to claim 6 comprising the steps of;

obtaining the tap assembly in a closed position, opening the tap assembly utilising the step of, rotating the valve closure to move the multi-start male thread from a top of the female thread to a bottom of the female thread, or engaging the actuator to move the sealing bead from the closed position to the open position.

* * * * *